United States Patent [19]

Bullman

[11] 4,133,796

[45] Jan. 9, 1979

[54] HIGH TEMPERATURE RESISTANT HOT MELT SEALANT

[75] Inventor: Allan R. Bullman, Bernardsville, N.J.

[73] Assignee: Union Carbide Corporation, New York, N.Y.

[21] Appl. No.: 852,482

[22] Filed: Nov. 17, 1977

[51] Int. Cl.$^2$ .............. C08L 9/00; C09J 3/14
[52] U.S. Cl. .............. 260/37 EP; 156/330; 156/335; 260/38; 260/42.43; 427/207 A; 427/207 B
[58] Field of Search .............. 427/207 A, 207 B; 260/37 EP, 38, 42.43; 156/330, 335

[56] References Cited

U.S. PATENT DOCUMENTS

| | | | |
|---|---|---|---|
| 3,644,252 | 2/1972 | Sherfeld et al. | 260/27 R |
| 3,691,120 | 9/1972 | Susuki et al. | 260/42.43 |
| 3,790,647 | 2/1974 | Kiss et al. | 260/897 R |
| 3,849,353 | 11/1974 | Taft | 260/27 R |
| 3,868,433 | 2/1975 | Bartz et al. | 260/876 R |
| 3,931,077 | 1/1976 | Uchigaki et al. | 260/27 R |
| 3,987,122 | 10/1976 | Bartz et al. | 260/836 |
| 3,988,493 | 10/1976 | Yallourakis | 260/42.43 |
| 4,004,061 | 1/1977 | Creighton et al. | 427/207 A |
| 4,028,292 | 6/1977 | Korpman | 260/27 R |
| 4,061,620 | 12/1977 | Gillern | 260/38 |

*Primary Examiner*—Ronald W. Griffin
*Attorney, Agent, or Firm*—Bernard Francis Crowe

[57] ABSTRACT

Hot melt compositions having good mechanical properties at elevated temperatures after post curing have been prepared by blending ethylene copolymers with a rubber, a phenolic resin, epoxy resin, and a filler formulated to 100% by weight solids.

15 Claims, No Drawings

HIGH TEMPERATURE RESISTANT HOT MELT SEALANT

BACKGROUND OF THE INVENTION

This invention pertains to hot melt sealants and more particularly to those having enhanced mechanical properties at elevated temperatures.

In the field of adhesives, the trend to hot melt systems has been accelerated in recent years. Hot melt systems provide a 100% solids system containing no volatiles, thereby avoiding the air pollution problems encountered with solvent systems. Another advantage giving impetus to the development of hot melt sealant systems is their ability to develop final mechanical properties almost immediately after application. However, these final mechanical properties are limited because of the limitations required for the application of the adhesive in a melt state to a particular substrate. The high temperature final properties are even more limited as they approach the hot melt systems application temperature. For example, adhesion and lap shear strengths at temperatures in service ranges of about 125° F. (51.7° C.) are generally unattainable with presently available hot melt sealant systems. To further complicate the problem these hot melt sealants should also exhibit good low temperature properties without detracting from ease of applicability or high temperature properties.

SUMMARY OF THE INVENTION

A hot melt sealant composition having both good low temperature and high temperature mechanical properties which can be applied to substrates with conventional hot melt application equipment has been developed which comprises:

(A) About 5 to about 50 percent by weight of an ethylene copolymer selected from the group consisting of ethylene/vinyl acetate copolymers having a melt index of (a) about 1 to about 500 dg./min. containing about 3 to about 40 percent by weight of vinyl acetate copolymerized therein and (b) ethylene/alkyl acrylate or methacrylate copolymers having a melt index of about 1 to about 500 dg./min. containing about 3 to about 35 percent by weight of an alkyl acrylate or methacrylate copolymerized therein wherein the alkyl group contains about 3 to about 6 carbon atoms:

(B) About 5 to about 50 percent by weight of a rubber or elastomer;

(C) About 2 to about 40 percent by weight of at least one alkyl substituted phenolic resin;

(D) About 0.5 to about 10 percent by weight of an epoxy resin containing at least 2 epoxy units per molecule; and (E) About 20 to about 70 percent by weight of filler all based on the weight of the total composition.

The term "sealant" is used to mean a high viscosity, high solids, elastomeric composition which is primarily used to fill gaps in structures to resist the passage of air, dust, and the like. In certain applications sealants may be required to have high tensile properties for applications requiring added structural strength between metal, glass, wood, and the like. In some of these higher performance applications these compositions have been referred to as structural adhesives.

It is preferred to use about 10 to about 30% of these ethylene copolymers based on the weight of the total composition and even more preferred to use about 15 to about 20% by weight of ethylene copolymer.

A preferred ethylene/vinyl acetate polymer is a commercially available low molecular weight polymer having a melt index of 350 dg./min. and a softening point of 183° C. Other commercially available ethylene/vinyl acetate copolymers may also be used if desired. Some have a melt viscosity of less than 400 dg./min. and a vinyl acetate content of about 10 to about 40 percent by weight polymerized therein. These copolymers preferably have about 10 to 30% by weight and more preferably about 15 to about 25% by weight of vinyl acetate copolymerized therein. These copolymers preferably have a melt index of about 100–400 dg./min. and more preferably a melt index of about 125–350 dg./min.

When the ethylene copolymer is an ethylene/alkyl acrylate or methacrylate copolymer it is preferred that about 10 to about 40%, based on total composition weight, of alkyl acrylate or methacrylate is copolymerized therein and even more preferred to have about 20 to about 25% by weight of alkyl acrylate or methacrylate copolymerized therein. Preferred alkyl groups are methyl and ethyl. These ethylene copolymers preferably have a melt index of about 20–400 dg./min. and more preferably a melt index of about 100–300 dg./min.

A preferred ethylene/alkyl acrylate copolymer is an ethylene/ethyl acrylate copolymer commercially available, having a melt index of about 20 dg./min. and a softening point of about 128° C., containing about 23% by weight of ethyl acrylate copolymerized therein. Other ethylene/alkyl acrylates can also be used if desired including ethylene/methyl acrylate copolymers, ethylene/isopropyl acrylate copolymers, ethylene/butyl acrylate copolymers, ethylene/hexyl acrylate copolymers, and the like.

Preferred rubbers or elastomers include such commercially available materials as:

ethylene/propylene copolymers and terpolymers where the third comonomer is an aliphatic unconjugated diene or an endomethylenic diolefin as recited in the Encyclopedia of Polymer Science and Technology, Vol. 6, page 367, Interscience Publishers, NYC, 1967 which is incorporated herein by reference;

Styrene-diene-styrene block copolymers where the diene component can be butadiene, isoprene, chlorprene, piperylene, and the like;

butyl rubbers;

crosslinked butyl rubbers;

ethylene/propylene copolymer elastomers;

amorphous polypropylene rubbers;

mixed polymers of butadiene and styrene; and the like.

It is preferred to use about 15 to about 30% of rubber or elastomer, based on the total weight of the composition, and even more preferred to use about 15 to 25% by weight.

The phenolic resins useful for this invention are commercially available and are described in "The Chemistry of Phenolic Resins" by R. W. Martin, pg. 87–116, John Wiley and Sons Inc. NYC (1956) incorporated herein by reference.

Both heat-reactive resins or resoles and nonheat-reactive resins or novolaks are included in the definition of phenolic resins useful in this invention. They can be obtained commercially or can be synthesized by methods known in this art. Thus for example the resoles used herein are prepared by the base catalyzed condensation of a molar excess of formaldehyde or a methylene engendering agent such as hexamethylene tetramine with a phenol substituted with a lower alkyl having 1 to about 6 carbons. The novolaks are prepared by the acid catalyzed condensation of a molar excess of a phenol substituted with a lower alkyl having 1 to about 6 carbons with formaldehyde or a methylene engendering agent such as hexamethylene tetramine. It should be noted that unsubstituted phenol does not afford satisfactory phenolic resins in this invention.

It is preferred to employ about 10–30% of phenolic resin based in the weight of the total composition and even more preferred to employ about 15–20% by weight of phenolic resin.

The epoxy resins used in this invention can be either normally liquid or normally solid and have at least two 1,2-epoxy groups per molecule. One class of preferred epoxy resins, which are homologs of diglycidyl ethers, can be represented by the formula:

wherein: n is an integer representing the number of repeating units and has a value of 0 to about 10 and Z is an arylene radial having 6 to about 20 carbons. The preferred arylene radical is the moiety remaining after the removal of the two hydroxyl groups from bisphenol A or 2,2-bis(p-hydroxy phenyl)propane having the formula below:

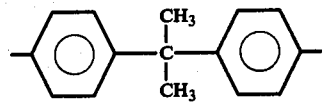

Another preferred epoxy resin is triglycidyl p-aminophenol described in U.S. Pat. No. 2,951,825.

Still other preferred thermosetting epoxy resins are the 1,2-cycloaliphatic diepoxides. They are exemplified by the following:

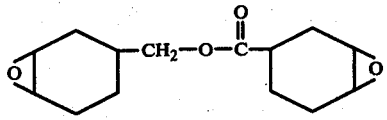

3,4-epoxycyclohexylmethyl-3,4-epoxycyclohexane carboxylate,

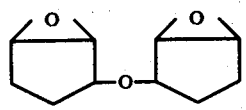

bis(2,3-epoxycyclopentyl)ether,

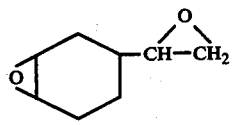

vinylcyclohexenedioxide, and

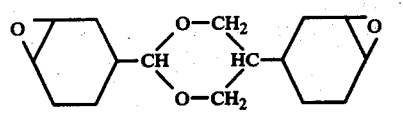

2-(3,4-epoxycyclohexyl-5,5-spiro)-(3,4-epoxy) cyclohexane-m-dioxane.

A general description of the preparation of these epoxy resins is presented in the Encyclopedia of Polymers Science and Technology, Page 209, Volume 6, Intersciences Publishers, NYC, 1967, incorporated herein by reference.

Another reference incorporated herein is "Epoxy Resins" by H. Lee and K. Neville, McGraw Hill Book Co. Inc., 1957.

It is preferred to use about 1–5% epoxy resin based on the weight of the total composition.

Preferred fillers are inorganic compounds such as silicates, oxides, carbonates, sulphates, hydroxides, carbon, metals in the form of powders, fibers, whiskers or wire, and such miscellaneous materials as barium ferrite, magnetite, molybdenum disulfide, glass, and the like. Preferred inorganic fillers include calcium carbonate, calcium oxide, magnesium carbonate, barium sulfide, magnesium hydroxide, carbon black, copper, aluminum, bronze, lead, zinc, or steel powders, and the like. While about 20 to about 70% of filler based on the weight of the composition can be used, it is preferred to employ about 30–70% and even more preferred to employ about 40–60% of filler.

One can also use organic fillers such as lignin materials, protein materials, synthetic fibers, cellulosic materials, and the like.

Hot melt sealant formulation are extremely viscous requiring the use of heavy-duty mixers to prepare them. It has been found to be convenient to employ a kneader-extruder sigma blade mixer, jacketed either for steam or for oil heating. Any high-shear, sigma-blade type mixer can be used to make hot melt sealant formulations. Commercially available extruder guns are also available which are simple to operate and handle extremely viscous formulations.

The invention is further described in the Examples which follow. All parts and percentages are by weight unless otherwise specified.

The following is a glossary of commercial products used in the hot melt sealant compositions of this invention.

ETHYLENE COPOLYMERS

Bakelite EVA-501-Trademark of Union Carbide Corp. for an ethylene/vinyl acetate copolymer having a density of 0.943 g/cm$^3$, a melt index (ASTM D-1238) of 350 dg./min. and an inherent viscosity (in toluene as a 0.25% solution at 30° C.) of 0.54 containing 28% by weight vinyl acetate copolymerized therein.

Bakelite EVA-604-Trademark of Union Carbide Corp. for an ethylene/vinyl acetate copolymer having a density of 0.954 g./cm$^3$, and a melt index of 45 dg./min., containing 33% by weight vinyl acetate copolymerized therein.

Bakelite EVA-605-Trademark of Union Carbide Corp. for an ethylene/vinyl acetate copolymer having a density of 0.954 dg./cm$^3$, a melt index of 20 dg./min. and an inherent viscosity of 0.74 containing 33% by weight vinyl acetate copolymerized therein.

Bakelite EVA-607-Trademark of Union Carbide Corp. for an ethylene/vinyl acetate copolymer having a density of 0.954 g./cm$^3$, a melt index of 5 and an inherent viscosity of 0.94 containing 33% by weight vinyl acetate copolymerized therein.

Bakelite DPDA-2304-Trademark of Union Carbide Corp. for an ethylene/ethyl acrylate copolymer having a density of 0.931 g./cm$^3$ and a melt index of 20 containing 20% by weight ethyl acrylate copolymerized therein.

A-C-580- Ethylene copolymers available from Allied Chemical Co. containing olefin acid comonomer having an average molecular weight of 1500-2000, a melting point of 89°-100° C. and a specific gravity of 0.92-0.93 g./cc.

PHENOLIC RESINS

Bakelite CK-0036-Tradename of Union Carbide Corp. for a non-heat reactive, oil-soluble alkyl substituted phenolic resin having a softening point (ASTM D-1304) of 185°-210° F. (85°-99.2° C.).

Bakelite CK-1634-Trademark of Union Carbide Corp. for a heat-reactive, oil-soluble, alkyl substituted phenolic resin having a softening point of 190°-220° F. (87.5°-104.5° C.)

Bakelite CK-1834-Trademark of Union Carbide Corp. for a heat-reactive, oil-soluble alkyl substituted phenolic resin having a softening point of 185°-215° F. (85°-101.5° C.)

Bakelite CK-2103-Trademark of Union Carbide Corp. for a non-heat reactive, oil-soluble alkyl substituted phenolic resin having a softening point of 215°-245° F. (101.5°-118.5° C.)

Bakelite CK-2400-Trademark of Union Carbide Corp. for a non-heat reactive oil-soluble alkyl substituted phenolic resin having a softening point of 290°-315° F. (143°-157.5° C.)

Bakelite CK-2432-Trademark of Union Carbide Corp. for a non-heat reactive, oil-soluble alkyl substituted phenolic resin having a softening point of 250°-280° F. (121.5°-138.5° C.)

Bakelite BKPA-5864-Trademark of Union Carbide Corp. for a heat reactive hexamethylene-tetramine modified unsubstituted phenolic resin.

EPOXY RESINS

Bakelite ERL-2744-Trademark of Union Carbide Corp. for a liquid bisphenol A epoxy resin having an epoxide equivalent of 185-200.

Bakelite ERL-4221-Trademark of Union Carbide Corp. for a liquid cycloaliphatic epoxy resin having an epoxide equivalent of 131-143.

Epon 1002- Trademark of Shell Oil Co. for solid bisphenol A epoxy resins having an epoxide equivalent of 600-700.

Epon 1004- Trademark of Shell Oil Co. for solid bisphenol A epoxy resin having an epoxide equivalent of 870-1025.

Araldite 6010- Trademark of Ciba-Geigy Corp. for a liquid bisphenol A epoxy resin having an epoxide equivalent of 185-196.

RUBBERS OR ELASTOMERS

Solprene 4000-Trademark of Phillips Petroleum Co. for mixed polymers of butadiene and styrene.

AFAX-800- Trademark of Hercules Inc. for a low molecular weight amorphous polypropylene rubber having a viscosity at 375° F. (190.5° C.) of 50 centipoise.

AFAX-700- Same as AFAX-800 but with a viscosity of 310,000 centipoise at 375° F.

AFAX-600 HL-5- Same as AFAX-800 but with a viscosity of < 100 centipoise at 375° F.

AFAX-500 HL-0-Same as AFAZ-800 but with a viscosity of < 2,500 centipoise at 375° F.

BUCAR-5214-Trademark of Cities Service Co. for cross-linked butyl rubber.

EX-245- Trade designation of Cities Service Co. for compounded butyl rubber.

VISTOLON 404- Trademark of Exxon Chemical Co. for ethylene/propylene copolymer elastomer.

VISTOLON 2504- Trademark of Exxon Chemical Co. for ethylene/propylene terpolymer.

KRATON-3125- Trademark of Shell Oil Co. for a styrene-butadiene-styrene block copolymer.

KRATON-6521- Trademark of Shell Oil Co. for a styrene-isoprene-styrene block copolymer.

FILLERS

Atomite- Trademark of Thompson and Weiman for calcium carbonate with an average particle size of 2.5 microns.

Camel-White Trademark of Harry T. Campbell Son's Corp. for calcium carbonate.

Snowflake- Trademark of Thompson and Weiman for calcium carbonate with an average particle size of 5 microns.

Duramite Calcium carbonate with an average particle size of 10 microns.

Barytes No. 1-Barium sulfate, approximate particle size of 1.75 microns sold by Pfizer Co.

Santicizer 160-Trademark of Monsanto Co. for butyl benzyl phthalate.

EXAMPLES 1-11

Using a 1 gallon AMK kneader-extruder (Charles Ross and Son, Happauge, N.Y.) a hot melt sealant composition was prepared by blending EVA-501, AFAX-800, Bakelite CK-1834 phenolic resin, BUGAR-5214 and Atomite in the proportions shown in Table 1. Other formulations were also prepared in the proportions shown in Table 1. They were then evaluated by extruding them with a Hardman P-Shooter extruder gun (Hardman, Inc., Belleville, N.J.) onto glass, aluminum, anodized aluminum, and steel substrates at 275° F. (135° C.) and 400° F. (205° C.). The peel strengths of the resultant substrate-sealant composites were observed and rated subjectively as fail (F), poor (P), fair (FA), good (G), very good (VG) and excellent (EX) as shown in Table 1. In addition steel lap shear tests, using one sq. in overlap, were also carried out bonding the steel specimens with each of the formulations at an extrusion temperature of 205° C. and either a post heating of 30 minutes at 350° F. (167° C.) or no post heat treatment. The test was conducted by raising the temperature, at a rate of 1°/min., of a vertically hung pair of bonded specimens having a 500 g. weight attached to the lower specimen. The temperature at which the weighted specimen yielded and dropped one inch was recorded as the failing point.

EXAMPLES 12-15

The procedure described in Examples 1-11 was followed for the evaluation of formulations containing EVA-501, AFAX-800, AFAX-LR327, AFAX-600-HL-R, AFAZ-500-HL-0, A-C-580, Bakelite CK-1834, BUCAR-5214 and Barytes-1. The amounts of each component are shown in Table 2 as well as the peel strength evaluation of the formulations deposited with the Hardman P-Shooter extruder gun at 350° F. (176.5° C.) and 400° F. (205° C.).

TABLE 1

| | EXAMPLES WEIGHT PERCENT | | | | | | | | | | |
|---|---|---|---|---|---|---|---|---|---|---|---|
| | 1 | 2 | 3 | 4 | 5 | 6 | 7 | 8 | 9 | 10 | 11 |
| EVA-501 | 14 | 14 | 14 | 14 | 14 | 14 | 14 | 13 | — | — | 14.10 |
| AFAX-800 | 15 | 15 | 14 | 14 | 13 | 13 | 13 | 11 | 9.50 | 9.7 | 13.14 |
| Bakelite CK-1834 | 12 | 12 | 12 | — | 8.5 | 8.5 | 8.5 | 8 | 6.20 | 6.3 | 8.60 |
| Bakelite CK-2400 | — | — | — | 12 | 4.5 | 4.5 | 4.5 | 4 | 3.20 | 3.2 | 4.55 |
| ARALDITE 6010 | — | — | 2 | 2 | 2 | — | — | — | — | — | — |
| BUCAR-5214 | 19 | 19 | 18 | 18 | 18 | 18 | 18 | 17 | 11.60 | 11.9 | 18.20 |
| ATOMITE | 40 | 40 | 40 | 40 | 40 | 35.7 | 32 | 37 | 59.07 | 59.2 | 40.50 |
| EPON-1002 | — | — | — | — | — | 6.3 | — | — | — | — | — |
| EPON-1004 | — | — | — | — | — | — | 10 | 10 | — | — | — |
| ERL-4221 | — | — | — | — | — | — | — | — | 0.93 | — | 0.91 |
| ADHESION AFTER HOT GUN EXTRUSION AT 400° F (205° C) TO SUBSTRATES | | | | | | | | | | | |
| ALUMINUM | EX | EX | EX | G+ | EX | G | EX | V.G. | — | — | — |
| ANODIZED ALUMINUM | EX | V.G. | EX | G | V.G. | P | EX | EX | — | — | — |
| STEEL | EX | EX | EX | G+ | EX | F+ | EX | " | — | — | — |
| GLASS | EX | EX | EX | G+ | EX | G | G | " | — | — | — |
| TEMP. AT WHICH 500 GRAM WEIGHT DROPPED ONE SQ INCH IN STEEL LAP SHEAR TESTS WITH 400° F EXTRUSION-NO POST HEAT | (63° C) 145° F | (70° C) 158° F | (64° C) 147° F | (69° C) 156° F | (72° C) 162° F | (67° C) 154° F | (67° C) 154° F | (100° C) 212° F | (75° C) 167° F | — | (62° C) 144° F |
| TEMP. AT WHICH 500 GRAM WEIGHT DROPPED, ONE SQ. INCH IN STEEL LAP SHEAR TEST WITH 400° F EXTRUSION-POST HEATED 30 MINS. 350° F (17.5° C) | (65° C) 149° F | (72° C) 160° F | (64° C) 147° F | (121.5° C) 260° F | (121° C) 250° F | (104.5° C) 220° F | (105° C) 221° F | — | (126.5° C) 260° F | — | (90° C) 194° F |

TABLE 2

| | | EXAMPLES WEIGHT PERCENT | | | |
|---|---|---|---|---|---|
| | | 12 | 13 | 14 | 15 |
| EVA-501 | | 5 | 5 | 5 | 5 |
| AFAX-800 | | 14 | — | — | — |
| AFAX-LR-327 | | — | 14 | — | — |
| AFAX 600HL-5 | | — | — | 14 | — |
| AFAX 500HL-0 | | — | — | — | 14 |
| A-C-580 | | 9 | 9 | 9 | 9 |
| Bakelite CK-1834 | | 18 | 18 | 18 | 18 |
| BUCAR-5214 | | 14 | 14 | 14 | 14 |
| BARYTES NO. 1 | | 40 | 40 | 40 | 40 |
| ADHESION AFTER HOT GUN EXTRUSION AT 350° F (176.5° C) TO SUBSTRATES | Glass | EX | G | V.G. | V.G. |
| | Aluminum | V.G. | G | V.G. | G |
| | Anodized Aluminum | G | G | FAIR | P |
| | Steel | V.G. | F | P | P |
| ADHESION AFTER HOT GUN EXTRUSION AT 400° F (205° C) TO SUBSTRATES | Glass | EX | V.G. | V.G. | V.G. |
| | Aluminum | EX | V.G. | EX | V.G. |
| | Anodized Aluminum | EX | V.G. | V.G. | G. |
| | Steel | EX | V.G. | V.G. | G |

EXAMPLES 16–20

The procedure described in Examples 1–11 was employed for the preparation of hot melt heat sealants from EVA-501, DPDA-2304, EVA-604, AFAX 800, Bakelite CK-1834, Bucar-5214 and Atomite. The proportions of these components are given in Table 3 together with the peel strength evaluation of these components when deposited with Hardman gun at 400° F. (204° C.), on glass, aluminum and anodized aluminum.

EXAMPLES 21–23

Hot melt heat sealant compositions were compounded using the procedure described in Examples 1–11 with EVA-501, DPDA-2304, EVA-604, AFAX 800, Bakelite CK-1834, Bucar-5214, and Atomite. The proportions of the components are delineated in Table 4 together with peel strength evaluations of these formulations deposited on 4 substrates from a Hardman gun at 300° F. (149° C.) and 400° F. (205° C.).

EXAMPLES 24–31

The procedure described in Examples 1–11 was used to prepare hot melt heat sealant formulations containing EVA-501, AFAX-800, Bakelite CK-1834, Bakelite CK-2400, Araldite 6010, Bucar-5214, calcium oxide, Camelwite, snowflake, and Duramite. The amounts of the components are given in Tables 5 and 6 together with the peel strength evaluation of these materials deposited with a Hardman gun at 400° F. (205° C.), as well as lap-shear tests using a 1,000 gram dead weight with one sq. in. over-lap for non-post cured compositions and compositions cured for 30 min. at 325° F. (163° C.) and 350° F. (177° C.). These evaluation data demonstrate the desirability of incorporating calcium carbonate fillers to achieve maximum heat resistance. Control A using only 3% calcium oxide shows low shear strengths.

TABLE 3

| | | Melt Index (dg./min.) | EXAMPLES WEIGHT PERCENT | | | | |
|---|---|---|---|---|---|---|---|
| | | | 16 | 17 | 18 | 19 | 20 |
| EVA-501 | | 350 | 45 | — | — | — | — |
| EVA-607 | | 5 | — | 45 | — | — | — |
| EVA-303 | | 125 | — | — | 45 | — | — |
| EVA-305 | | — | — | — | — | 45 | — |
| EVA-605 | | 20 | — | — | — | — | 45 |
| Bakelite CK-1834 | | — | 30 | 30 | 30 | 30 | 30 |
| Bakelite ERL-2774 | | — | 5 | 5 | 5 | 5 | 5 |
| CAMELWITE | | — | 20 | 20 | 20 | 20 | 20 |
| ADHESION AFTER HOT GUN EXTRUSION AT 400° F (205° C) TO SUBSTRATES | Glass | | EX | F | F | F | F |
| | Aluminum | | V.G. | F | F | F | F |
| | Anodized Aluminum | | EX | F | F | F | P |

TABLE 4

| | | Melt Index (dg./min.) | EXAMPLES WEIGHT PERCENT | | |
|---|---|---|---|---|---|
| | | | 21 | 22 | 23 |
| EVA-501 | | 350 | 14 | — | — |
| DPDA-2304 | | 20 | — | 14 | — |
| EVA-604 | | 45 | — | — | 14 |
| AFAX-800 | | — | 15 | 15 | 15 |
| Bakelite CK-1834 | | — | 12 | 12 | 12 |
| BUCAR-5214 | | — | 19 | 19 | 19 |
| ATOMITE | | — | 40 | 40 | 40 |
| ADHESION AFTER HOT GUN EXTRUSION AT 300° F (149° C) TO SUBSTRATES | GLASS | | G | P | P |
| | ALUMINUM | | G+ | F | F |
| | ANODIZED ALUMINUM | | V.G. | P | FAIR+ |
| | STEEL | | G+ | F | F |
| ADHESION AFTER HOT GUN EXTRUSION AT 400° F (205° C) TO SUBSTRATES | GLASS | | EX | V.G. | G |
| | ALUMINUM | | EX | FAIR | FAIR+ |
| | ANODIZED ALUMINUM | | EX | V.G. | V.G. |
| | STEEL | | EX | P | P |

TABLE 5

| | | EXAMPLES WEIGHT PERCENT | | |
|---|---|---|---|---|
| | | 24 | 25 | 26 |
| EVA-501 | | 9.2 | 9.2 | 9.2 |
| AFAX-800 | | 9.2 | 9.2 | 9.2 |
| Bakelite CK-1834 | | 6.0 | 6.0 | 6.0 |
| Bakelite CK-2400 | | 3.0 | 3.0 | 3.0 |
| ARALDITE 6010 | | 1.35 | 1.35 | 1.35 |
| BUCAR-5214 | | 11.25 | 11.25 | 11.25 |
| CALCIUM OXIDE | | 3.00 | 3.00 | 3.00 |
| CAMELWITE (2.5) Avg. Microns | | 57.00 | — | — |
| SNOWFLAKE (5.0) Avg. Microns | | — | 57.00 | — |
| DURAMITE (10.0) Avg. Microns | | — | — | 57.00 |
| ADHESION AFTER HOT GUN EXTRUSION AT 400° F (205° C) TO SUBSTRATES | GLASS | G | G | G+ |
| | ALUMINUM | FAIR+ | G | V.G. |
| | ANODIZED ALUMINUM | FAIR | FAIR | G |
| | STEEL | FAIR | FAIR | G |
| 1000 GRAM WEIGHT DEAD LOAD TEST, TEMPERATURE AT WHICH ADHESIVE WILL HOLD (NO POST CURE) | | 100° F(37.6° C) | 100° F(37.6° C) | 100° F(37.6° C) |

TABLE 5-continued

| | EXAMPLES WEIGHT PERCENT | | |
|---|---|---|---|
| | 24 | 25 | 26 |
| POSTCURE 30 MINS at 350° F | 300° F(149° C) | 275° F(135° C) | 300° F(139° C) |

TABLE 6

| | | EXAMPLES WEIGHT PERCENT | | | | |
|---|---|---|---|---|---|---|
| | | CONTROL A | 27 | 28 | 29 | 30 | 31 |
| EVA-501 | | 22.64 | 18.67 | 16.34 | 14.00 | 11.50 | 9.20 |
| AFAX-800 | | 22.64 | 18.67 | 16.34 | 14.00 | 11.50 | 9.20 |
| Bakelite CK-1834 | | 13.74 | 11.33 | 9.92 | 8.50 | 7.50 | 6.00 |
| Bakelite CK-2400 | | 7.27 | 6.00 | 5.24 | 4.50 | 3.75 | 3.00 |
| ARALDITE 6010 | | 3.23 | 2.67 | 2.33 | 2.00 | 1.65 | 1.35 |
| BUCAR-5214 | | 27.48 | 22.66 | 19.83 | 17.00 | 14.10 | 11.25 |
| CALCIUM OXIDE | | 3.00 | 3.00 | 3.00 | 3.00 | 3.00 | 3.00 |
| CAMELWITE | | — | 17.00 | 27.00 | 37.00 | 47.00 | 57.00 |
| ADHESION AFTER APPLYING AT 400° F SUBSTRATE | | | | | | | |
| | GLASS | EX | EX | EX | EX | G+(F) | G |
| | ALUMINUM | EX | EX | EX | V.G. | G(F) | FAIR+ |
| | ANODIZED ALUMINUM | EX | EX | EX | EX | G(F) | FAIR |
| | STEEL | EX | EX | EX | G+ | G(F) | FAIR |
| STEEL LAP SHEAR TEMP. AT WHICH 1000 GRAM WGT WILL BE HELD (MIN. 20 HRS) | | | | | | | |
| (A) NO POST CURE | | (32.5° C) 90° F | (37.5° C) 100° F | (37.5° C) 100° F | (37.5° C) 100° F | (37.5° C) 100° F | (37.5° C) 100° F |
| (B) 30' at 325° F | | (163.5° C) — | (52° C) 125° F | (52° C) 125° F | (52° C) 125° F | (65.5° C) 150° F | (121.5° C) 250° F |
| (C) 30' at 350° F | | (176.5° C) (37.5° C) 100° F | 52° C) 125° F | (65.5° C) 150° F | (93.5° C) 200° F | (121.5° C) 250° F | (149° C) 300° F |

F = FILM FAILURE
G = GOOD
V.G. = VERY GOOD
EX = EXCELLENT

EXAMPLES 32–36

Hot melt sealant formulations were prepared as described in Examples 1–11 with EVA-501, AFAX-800, Bakelite CK-1834, Bucar 5214, and Atomite. The proportions of the components are given in Table 7 together with peel strength results obtained by depositing these formulations on glass, aluminum, anodized aluminum, steel, and cement with a Hardman gun at 350° F. (176.5° C.) and 400° F. (205° C.).

EXAMPLES 37–40

Hot melt heat sealant formulations prepared using the procedure described in Examples 1–11 with EVA-501, Bakelite CK-1834, CK-2432, Bakelite CK-2103, Bakelite-1634, Santicizer 160, and Camelwite. The proportions of the components are given in Table 8 together with the peel evaluation of deposits on glass, aluminum, and anodized aluminum. Control B demonstrates the unexpected finding that an unsubstituted phenol-formaldehyde resin cannnot be used.

TABLE 7

| | | EXAMPLES WEIGHT PERCENT | | | | |
|---|---|---|---|---|---|---|
| | | 32 | 33 | 34 | 35 | 36 |
| EVA-501 | | 14 | 14.5 | 16.5 | 17.5 | 19.5 |
| AFAX-800 | | 15 | 13.0 | 12.0 | 11.0 | 11.0 |
| Bakelite CK-1834 | | 12 | 13.5 | 13.5 | 13.5 | 13.5 |
| BUCAR-5214 | | 19 | 19.0 | 18.0 | 18.0 | 16.0 |
| ATOMITE | | 40 | 40.0 | 40.0 | 40.0 | 40.0 |
| ADHESION AFTER HOT GUN EXTRUSION AT 350° F (176.5° C) TO SUBSTRATES | GLASS | V.G. | V.G. | V.G. | V.G. | V.G. |
| | ALUMINUM | V.G. | V.G. | EX | EX | V.G. |
| | ANODIZED ALUMINUM | EX | EX | EX | EX | EX |
| | STEEL | V.G. | V.G. | G+ | EX | V.G. |
| | CEMENT | P | P | FAIR | V.G. | V.G. |
| ADHESION AFTER HOT GUN EXTRUSION AT 400° F(205° C) TO SUBSTRATES | GLASS | EX | V.G. | EX | EX | EX |
| | ALUMINUM | EX | EX | EX | EX | EX |
| | ANODIZED ALUMINUM | EX | EX | EX | EX | EX |
| | STEEL | EX | EX | EX | EX | EX |
| | CEMENT | — | FAIR | G | V.G. | EX |

TABLE 8

| | | EXAMPLES WEIGHT PERCENT | | | | |
|---|---|---|---|---|---|---|
| | | 37 | 38 | 39 | 40 | CONTROL B |
| EVA-501 | | 45 | 45 | 45 | 45 | 45 |
| Bakelite CK-1834 | | 30 | — | — | — | — |
| Bakelite CK-2432 | | — | 30 | — | — | — |
| Bakelite CK-2103 | | — | — | 30 | — | — |
| Bakelite CK-1634 | | — | — | — | 30 | — |
| SANTICIZER 160 | | 5 | 5 | 5 | 5 | 5 |
| CAMELWITE | | 20 | 20 | 20 | 20 | 20 |
| Bakelite BKPA-5864 | | — | — | — | — | 30 |
| ADHESION AFTER HOT GUN EXTRUSION AT 325° F(163° C) TO SUBSTRATES | GLASS | V.G. | F | F | F | Reacted in mixer |
| | ALUMINUM | EX | F | P+ | F | |
| | ANODIZED ALUMINUM | V.G. | EX | EX | F | |

EXAMPLES 41–44

The procedure described in Examples 1–11 was used for other formulations described in Table 9 together with peel strength and dead load drop evaluation tests.

Although the invention has been described in its preferred forms with a certain degree of particularity, it is understood that the present disclosure of the preferred forms has been made only by way of example and that numerous changes may be resorted to without departing from the spirit and scope of the invention.

TABLE 9

| | | EXAMPLES WEIGHT PERCENT | | | |
|---|---|---|---|---|---|
| | | 41 | 42 | 43 | 44 |
| EVA-501 | | 14.0 | 12.5 | 12.0 | 10.0 |
| AFAX-800 | | 15 | 15 | 15 | 16 |
| Bakelite CK-2400 | | 12 | 12 | 12 | 12 |
| Bakelite ERL-2774 | | — | 0.5 | 1 | 2 |
| BUCAR-5214 | | 19 | 20 | 20 | 20 |
| ATOMITE | | 40 | 40 | 40 | 40 |
| ADHESION AFTER HOT GUN EXTRUSION AT 400° F(205° C) TO SUBSTRATES | GLASS | EX | G | G | G |
| | ALUMINUM | EX | G | G | G |
| | ANODIZED ALUMINUM | V.G. | G | G | P |
| | STEEL | G+ | G | G | P |
| DEAD LOAD DROP TEST 500 GRAMS TEMP. THAT WOULD SUPPORT 500 GRAM WGT. FOR MIN. OF 24 HRS. | | | | | |
| NO POST CURE, | | 158° F(70° C) | 158° F(70° C) | 158° F(70° C) | 169° F(76° C) |
| POST CURE FOR 30 MINS. AT 350° F(176.5° C) | | 160° F(71° C) | 207° F(98° C) | 231° F(111° C) | 270° F(132° C) |

What is claimed is:

1. Hot melt sealant composition comprising:
  (A) about 5 to about 50 percent by weight of an ethylene copolymer selected from the group consisting of: (a) ethylene/vinyl acetate copolymers having a melt index of about 1 to about 500 dg./min. containing about 3 to about 40 percent by weight of vinyl acetate copolymerized therein and (b) ethylene/alkyl acrylate or methacrylate copolymers having a melt index of about 1 to about 500 dg./min. containing about 3 to about 35 percent by weight of an alkyl acrylate or methacrylate copolymerized therein wherein the alkyl group contains about 3 to about 6 carbon atoms;
  (B) about 5 to about 50 percent by weight of a rubber or elastomer;
  (C) about 5 to about 50 percent by weight of at least one alkyl substituted phenolic resin;
  (D) about 2 to about 40 percent by weight of an epoxy resin containing at least 2 epoxy units per molecule; and
  (E) about 20 to about 70 percent by weight of filler, all based on the weight of the total composition.

2. Composition claimed in claim 1 wherein the ethylene copolymer is an ethylene/vinyl acetate copolymer.

3. Composition claimed in claim 1 wherein the ethylene copolymer is an ethylene/alkyl acrylate or methacrylate copolymer.

4. Composition claimed in claim 3 wherein the alkyl group is ethyl.

5. Composition claimed in claim 1 wherein the rubber is a crosslinked butyl rubber.

6. Composition claimed in claim 1 wherein the rubber is an ethylene/propylene copolymer.

7. Composition claimed in claim 1 wherein the rubber is an ethylene/propylene terpolymer.

8. Composition claimed in claim 1 wherein the phenolic resin is a heat-reactive condensation product of an alkyl substituted phenol and formaldehyde.

9. Composition claimed in claim 8 wherein the alkyl contains 1 to about 5 carbons.

10. Composition claimed in claim 1 wherein the phenolic resin is a non-heat reactive condensation product of an alkyl phenol and formaldehyde wherein the alkyl contains 1 to about 5 carbons.

11. Composition claimed in claim 1 wherein the epoxy resin is a homolog of the diglycidyl ether of bisphenol A.

12. Composition claimed in claim 11 wherein the epoxy resin is a mixture of normally solid and normally liquid resins.

13. Composition claimed in claim 1 wherein the filler is an alkaline earth compound.

14. Composition claimed in claim 13 wherein the alkaline earth compound is calcium carbonate.

15. Composition claimed in claim 13 wherein the alkaline earth compound is barium sulfate.